United States Patent [19]
Saito

[11] Patent Number: 6,071,378
[45] Date of Patent: Jun. 6, 2000

[54] METHOD AND DEVICE FOR TREATING A PULP SUSPENSION

[75] Inventor: Kuniaki Saito, Tokyo, Japan

[73] Assignee: Kvaerner Pulping AB, Karlstad, Sweden

[21] Appl. No.: 09/008,229

[22] Filed: Jan. 16, 1998

Related U.S. Application Data

[63] Continuation-in-part of application No. PCT/SE95/00862, Jul. 17, 1995.

[51] Int. Cl.[7] .............................. D21C 3/22; D21C 5/00; D06B 3/00; B30B 9/12
[52] U.S. Cl. .............................. 162/58; 162/56; 162/57; 68/182; 68/181 R; 100/117; 210/781; 210/374
[58] Field of Search .................................. 162/60, 57, 58, 162/56; 68/181 R, 182; 100/74, 117; 210/768, 772, 781, 360.1, 374, 377, 380.1

[56] References Cited

U.S. PATENT DOCUMENTS

| 4,286,512 | 9/1981 | Berggren ................................ 100/74 |
| 4,915,830 | 4/1990 | Mackay et al. .......................... 210/209 |

FOREIGN PATENT DOCUMENTS

| 39 17 151 A1 | 12/1989 | Germany . |
| 421 434 | 12/1981 | Sweden . |
| 463 425 | 11/1990 | Sweden . |
| 8700143 | 8/1992 | Sweden . |
| WO 90/02224 | 3/1990 | WIPO . |
| WO 90/12919 | 11/1990 | WIPO . |

*Primary Examiner*—Peter Chin
*Assistant Examiner*—Dionne A. Walls
*Attorney, Agent, or Firm*—Seed Intellectual Property Law Group, PLLC

[57] ABSTRACT

The present invention relates to a method for treating a pulp suspension in which the suspension is rotated in a rotationally symmetrical, rapidly rotating and permeable screen basket so that the suspension is subjected to the influence of a centrifugal force and dewatered at the same time as the suspension is conveyed by a rotating screw along the inner wall of the screen basket. The invention is characterized in that the suspension is caused to rotate by means which are arranged at the entrance to the screen basket, and in that the outer edges of the said screw bear against or are immediately adjacent to the screen basket and rotate at a higher speed than does the screen basket so that the screw scrapes the inner wall of the screen basket. The invention also relates to a device for implementing the method, which device comprises a housing (12), a screen basket (20) which is rotatably arranged in the said housing (12) and which is provided with screen openings, a screw body (72) which is rotatably arranged in the said screen basket (20) and which is arranged with a screw blade (79), an inlet (59) to the said screen basket (20) for the pulp suspension which is to be treated, an outlet (46, 52) from the said screen basket (20) for the pulp suspension which has been treated, and on outlet (62, 64) from the said housing (12) for liquid which has been removed. The device is characterized in that the said screen basket (20) is able to be rotated, via a transmission (26) which is arranged with a gearing, by a drive element (30), in that the screw body is able to be rotated, via a transmission (84) which is arranged with a gearing, by the said drive element (30), in that the screw blade (79) of the said screw body (72) moves along the inner side of the screen basket (20), with the gearing of the transmissions (26,84) being chosen so that the screw body (72) rotates faster than does the screen basket (20), so that the screw blade (79) has a scraping effect on the inner side of the screen basket (20), and in that an element (102) for initiating rotation of the pulp suspension is arranged at the inlet (59) to the screen basket (20), which element (102) is able to cause the pulp suspension to rotate when it enters the said screen basket (20).

4 Claims, 2 Drawing Sheets

METHOD AND DEVICE FOR TREATING A PULP SUSPENSION

CROSS-REFERENCE TO PRIOR APPLICATION

This application is a continuation-in-part of PCT Application Number PCT/SE95/00862, filed Jul. 17, 1995.

TECHNICAL FIELD

The present invention relates to a method and a device for treating a pulp suspension, in which the suspension is rotated in a rotationally symmetrical, rapidly rotating, liquid-permeable screen basket so that the suspension is subjected to the influence of a centrifugal force and dewatered at the same time as the suspension is conveyed by a rotating screw along the inner wall of the screen basket.

BACKGROUND OF THE INVENTION

During the production of paper pulp, the fibre material is repeatedly diluted and dewatered in dependence on its treatment in different stages of the process. Many different devices, such as suction filters, screw presses, roller presses and centrifuges, have been developed for this purpose. To achieve high dry substance contents of up to 30% requires large forces and hence large and power-consuming devices. A method which is often used for dewatering to such high dry substance contents consists in centrifuging the pulp suspension. The device often includes a liquid-permeable rotating basket in which the centrifugal force drives the suspension out towards the inner wall of the basket and presses the liquid through the wall. For the system to function satisfactorily, the suspension has, on the one hand, to be dispersed across the basket and, on the other hand, to be transported onwards during and after the dewatering; it is also necessary to ensure that the liquid-permeable basket is not plugged by fibres. It is a common practice to arrange a screw inside the screen basket for the purpose of dispersing and transporting the suspension. However, when a cylindrical screen basket is employed, substantial forces are required to move the fibre mass. Furthermore, there is a tendency for the fibre mass to collect against the screw blade during transport, resulting in the dewatering being impaired.

Another problem is that the suspension is difficult to set in rotation in the screen basket since it is only the inner wall of the screen basket which transmits the rotation to the suspension. The transmission of energy is poor in the case of a pulp suspension, which contains large quantities of water, indicating that the liquid will only very slowly begin to rotate inside the screen basket, irrespective of screen speed, and will require a long time before it gains a centrifugal force which is adequate to ensure efficient dewatering. The plugging of the screen basket is an additional problem; attempts to solve this make use of different elements such as, for example, nozzles which act from the outside and blow either air or liquid against the screen basket.

SUMMARY OF THE INVENTION

The object of the present invention is to eliminate the above-mentioned disadvantages and, at the same time, exploit the advantages which are inherent in centrifugal pulp suspensions. This object is achieved by a method for treating a fluid, in which the fluid is set in rotation in a rotationally symmetrical, rotating and liquid-permeable chamber and conveyed by a rotating screw along the inner wall of the liquid-permeable chamber, the outer edges of which bear against or are immediately adjacent to the liquid-permeable inner wall and rotate at a higher speed than the liquid-permeable chamber so that the screw scrapes or moves immediately adjacent to the inner wall of the liquid-permeable chamber, characterized in that the fluid is caused to rotate by means which are arranged at the entrance to the permeable chamber. The object is also achieved by a device for carrying out the above-mentioned method. The present invention also includes a washing device for simultaneous dewatering and washing.

BRIEF DESCRIPTION OF THE DRAWINGS

In the following description of a preferred embodiment of the invention, reference will be made to the attached drawing in which.

DETAILED DESCRIPTION OF THE INVENTION

Figure 1:
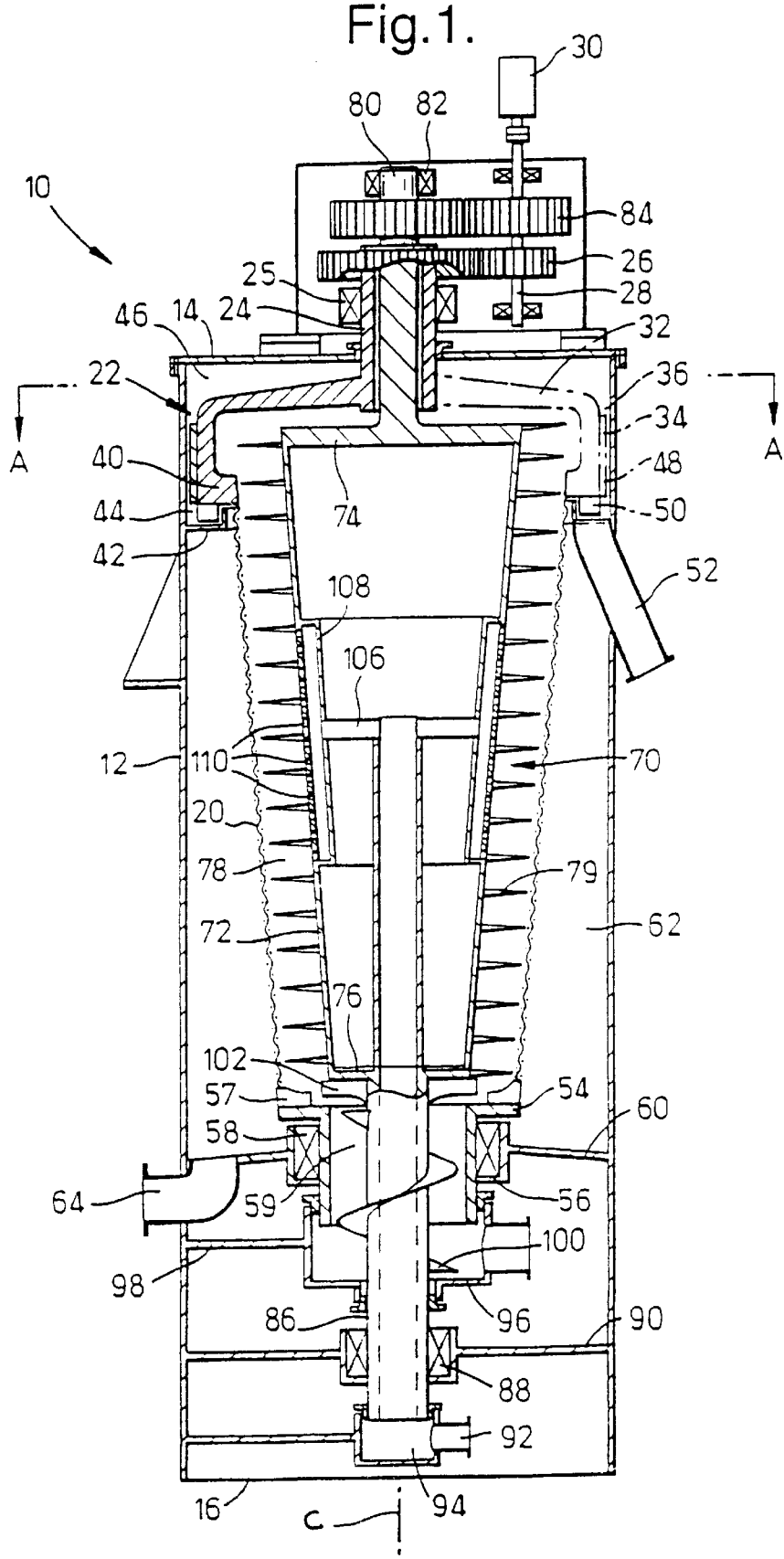
FIG. 1 shows a cut-away side view of a preferred embodiment of the device according to the invention.
Figure 2:
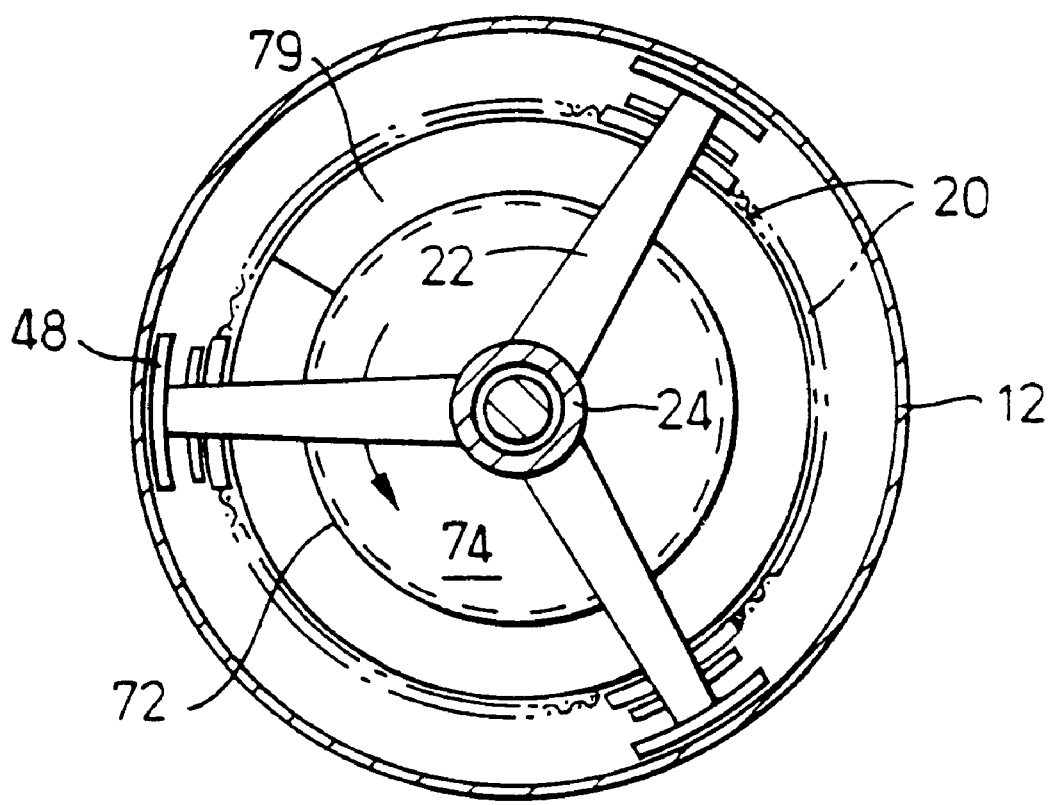
FIG. 2 is a plane view of A—A section in FIG. 1.

FIG. 1 shows a preferred device according to the invention which has the general designation of 10. The device includes a housing 12 which is preferably cylindrical and arranged so that its centre line C is vertical in the embodiment shown. However, it should be understood that the housing can be placed so that the centre line C is horizontal. The housing 12 is provided with two end walls, an upper end wall 14 and a lower end wall 16. A basket 20, hereinafter termed screen basket, which is rotationally symmetrical and provided with screen openings and whose axis of rotation coincides with the centre line C of the housing, is arranged inside the housing 12. In the preferred embodiment, the screen basket 20 is shaped somewhat conically with its diameter increasing from the lower end wall 16 towards the upper end wall 14.

Three substantially radially extending arms 22 are affixed to the upper end of the screen basket 20. The arms are at their intersecting point arranged with a hollow shaft 24 whose axis of rotation coincides with that of the screen basket 20. The shaft 24 extends through the upper end wall 14 and is rotatably mounted by means of a bearing 25. The upper end of the shaft 24 is arranged with a transmission 26 of a suitable type and with a suitable gearing which is able to transmit the rotation from the output shaft 28 of a driving element 30, expediently an electrical motor, to the shaft 24. In an alternate embodiment, the transmission 26 is a hydraulic transmission that closely controls the rotation of the shaft 24. Each of the arms 22 changes from an essentially radial part 32 to an essentially vertical part 34 whose radial distance is greater than the upper diameter of the screen basket 20 but somewhat smaller than the diameter of the housing 12, whereby a gap 36 is formed between the inner wall of the housing 12 and the vertical part 34 of each arm 22. The arms 22 are connected to the screen basket 20 by end parts 40 which extend essentially radially.

An annular wall 42 is affixed to the inner wall of the housing 12 at a certain axial distance from the end part 40 of the arms 22 so that a gap 44 is formed between the annular wall 42 and the end parts 40. The annular wall 42 seals against the screen basket 20 closely adjacent to its attachment to the end parts 40. This design of the upper part of the housing 12 results in the formation of a chamber 46, here termed outlet chamber, between the inner surfaces of the housing 12, the end wall 14 and the annular wall 42.

The arms 22 are arranged with scrapers 48 on the vertical part of the arms, which scrapers act against the inner wall of the housing in the gap 36, and with scrapers 50 on the end parts 40 of the arms, which scrapers act against the annular wall 42 in the gap 44. A pipe connection 52, which is affixed to a place on the annular wall 42, provides communication between the outlet chamber 46 and a pipe system (not shown) for the treated suspension.

The lower end of the screen basket 20 is affixed to a radially-extending flange 54 which is arranged on the upper part of a cylindrical support body 56 which has a hollow, through inlet 59. Blades 57, which are essentially directed radially, are arranged on the inside of the junction between the screen basket 20 and the flange. The support body 56 is rotatably mounted in a bearing 58, which bearing 58 is affixed to an annular support wall 60. The support wall 60 is, in turn, affixed to the inner wall of the housing 12. This design provides a cylindrical space 62, here termed reject space, between the screen basket 20 and the inner wall of the housing 12, which space is delimited axially by the annular wall 42 and the support wall 60. A pipe connection 64, which is affixed to the support wall 60, extends through the housing and provides communication between the reject space 62 and a pipe system (not shown) for the liquid which is driven out of the suspension.

A screw device, which is designated generally by the FIG. 70, is arranged inside the screen basket 20. The screw device 70 comprises a rotationally symmetrical body 72, hereinafter termed screw body, whose axis of rotation coincides with the axis of rotation of the screen basket 20. An upper end wall 74 and a lower end wall 76 are affixed to the screw body 72. In longitudinal section, the side walls of the screw body 72 have the same conicity as the screen basket 20 so that an annular gap 78 is formed between the side walls and the screen basket. A spirally shaped screw blade 79 is arranged on the outer wall of the screw body 72 from the lower end wall 76 and up to the upper end wall 74. In one embodiment the screw blade 79 has a width such that, along the whole of its length, its outer edge bears against the inner wall of the basket 20. In an alternate embodiment, the screw blade 79 has a length such that its outer edges are immediately adjacent to the inner wall of the basket. In a preferred embodiment, the screw blade 79 is spaced apart from the basket's inner wall by a gap of approximately 2 mm. The screw blade 79 thus acts in the space 78.

A shaft 80 is affixed to the upper wall 74. The shaft 80 extends through the hollow shaft 24 and, at its upper end, is rotatably mounted in a bearing 82. A transmission 84 connects, with suitable gearing, the shaft 80 to the output shaft 28 of the drive element 30. In one embodiment, the transmission 84 is a hydraulic transmission that rotates the screw body 72. The transmissions 94 and 26 that rotate the screw body 72 and the screen basket 20, respectively, are adapted to substantially maintain a constant difference of rotational speed between the screw body and the screen basket. Accordingly, the transmissions 84 and 26 must overcome the friction between the pulp and the rotating screw body 72 and screen basket 20, because the friction tends to make the rotating structures rotate at substantially the same speed, which is undesirable.

A hollow shaft 86 is affixed to the lower wall 76, which shaft 86 extends upwards through the wall and into the screw body 72 and also downwards through the cylindrical support body 56. The shaft 86 is rotatably mounted in a bearing 88 which is affixed to a support wall 90. The support wall 90 is, in turn, firmly affixed to the inner wall of the housing 12 at a distance below the support wall 60. A pipe connection 92 is arranged to the end of the shaft 86 via a stuffing box 94. The pipe connection 92 is coupled to a pipe system (not shown) for supplying washing liquid.

An inlet box 96 is arranged around the lower part of the cylindrical support body 56 and the shaft 86. The inlet box 96 is affixed to the housing 12 via support elements 98 and seals partly against the cylindrical support body 56 and partly against the shaft 86. A pipe system (not shown) is connected to the inlet box for supplying the pulp suspension which is to be treated. A feeding screw 100 is firmly affixed to the shaft 86 and extends from inside the inlet box upwards towards the end wall 76. Impeller blades 102 are affixed to the end wall 76. While the impeller blades 102 can be radial, they are preferably curved, having approximately the shape of an involute curve.

A spreading device 106 is arranged, either in the form of a number of radial pipes or in the form of two circular discs, at the upper end of the shaft 86. A box 108 is arranged, at the end of the spreading device, on at least part of the inner wall of the screw body 72, axially and around its circumference, which box 108 communicates with the spreading device. A number of passages 110 are arranged through the screw body between the box 108 and the rotation space 78. In the embodiment shown, the box and the passages are arranged approximately in the middle of the screw body as seen axially.

The device functions as follows. The screen basket 20 and the screw body 72 are caused to rotate by the motor 30 via the transmissions 26 and 84, respectively. By selecting the transmissions 26, 84 to have different gearings, the screw body 72 will rotate faster than the screen basket 20. The pulp suspension which is to be treated enters the box 96 via the pipe system (not shown). The suspension is conveyed by the screw 100 up through the inlet 59 in towards the lower wall 76 and its impeller blades 102. When the suspension comes in contact with the impeller blades 102, their rotation imparts a greatly increased speed of rotation to the suspension, which is thrown out towards the inner wall of the screen basket 20. The blades 57 also cooperate in increasing the speed of rotation of the suspension. Due to the fact that the impeller blades 102 have, so to speak, initiated the rotation of the pulp, the latter now accompanies the screen basket 20 in its rotation and, due to the high speed of rotation, a centrifugal effect is obtained which forms the pulp into a layer which is pressed against the permeable wall of the screen basket 20. Liquid in the suspension is thus forced out through the screen basket 20 and into the reject space 62, where the liquid is conveyed out through the outlet 64 and onwards into the pipe system (not shown). The rotating layer of suspension is now conveyed upwards along the inner surface of the screen basket with the aid of the screw blade 79 of the screw body 72 and is dewatered continuously. Due to the conical design of the screen basket 20, the centrifugal force imparts an axial force component to the pulp layer, resulting in very little force being required for the screw blade to push the layer of pulp along the inner side of the screen basket 20. Furthermore, as a consequence of the fact that the screw 70, by its screw blade 79, bears against or moves immediately adjacent to the inner side of the screen basket 20, a scraping effect is obtained, thereby ensuring that its passages are not plugged by pulp fibres. When the dewatered pulp layer has been fed up to the upper end of the screen basket 20, it is forced out by the centrifugal force towards the accept space 46, where the pulp is conveyed, with the aid of the scraping blades 48, 50, out through the outlet 52 and into the pipe system (not shown) for further treatment.

The device according to the invention can also be used to wash the pulp suspension. In this case, the pulp, is, as previously described, conveyed up into the screen basket 20 and dewatered. At the same time, fresh washing liquid is conveyed into the hollow shaft 86 from the pipe system via the connection 92 and the box 94. The washing liquid is conveyed via the spreaders 106 out into the box 108 of the screw body 72 and then, via the passages 110, out into the screen basket 20. Due to the fact that the washing liquid is also exposed to the centrifugal force when it is conveyed out into the screen basket 20, it penetrates into the dewatered pulp suspension.

The device according to the invention provides several advantages. Rotation of the pulp suspension is initiated at an early stage by the impeller blades 102 at the inlet to the screen basket 20. In the absence of the impeller blades 102, it is substantially more difficult to set the suspension in rotation, entailing the consequent risk of poor dewatering. Due to the conical design of the screen basket 20, the suspension is also given an axial force component, thereby making it easier for the screw blade to transport the pulp and consequently decreasing power requirement. With suitable choice of rotation speed and conicity, the axial force on the pulp can be arranged to be approximately equal to the friction of the pulp against the screen basket, and the pulp can then be moved with a minimum of force and thus without disturbing the pulp bed. Significant plugging of the screen basket is prevented by the scraping effect of the screw blade 79 bearing along the inner side of the basket. An additional advantage is that the fresh washing liquid is added from inside and is pressed into the pulp bed by the centrifugal force. The possibility can be conceived of using variable gearings on the transmissions between the drive element and the driven shafts of the screen basket and/or screw body in order to provide the opportunity of varying the rotation speeds of the screen basket and/or screw body. The possibility can also be conceived of arranging the box 108, for supplying fresh liquid, at other positions on the inner side of the screw body, as seen axially, or along the whole of the inner side of the screw body 72. The box 108 might also be divided into sections having separate supplies so that different liquids can be supplied to the device.

It is to be understood that the invention is not limited to the embodiment which has been described above and shown on the drawing, and can be modified within the scope of the patent claims.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. Method for treating a pulp suspension, in which the suspension is rotated in a rotationally symmetrical, rapidly rotating and liquid-permeable screen basket so that the suspension is subjected to a centrifugal force and dewatered at the same time as the suspension is conveyed by a rotating screw along the inner wall of the screen basket, characterized in that the suspension is caused to rotate by impeller means arranged at the entrance to the screen basket, said impeller imparting an initial increase of speed of rotation to the suspension, which suspension is thrown out towards the inner wall of the screen basket, and in that the outer edges of the said screw bear against the screen basket and rotate at a higher speed than the screen basket so that the screw scrapes the inner wall of the screen basket.

2. Method according to claim 1, characterized in that the screen basket is designed so that the centrifugal force imparts a radial and an axial force component to the pulp suspension during rotation in the chamber.

3. Method according to any one of the preceding claims, characterized in that fresh liquid is added to the pulp suspension at the same time as the latter is dewatered.

4. Method according to claim 3, characterized in that the fresh liquid is added inside the said screen basket so that the liquid is also affected by the centrifugal force and pressed by the latter into the suspension.

* * * * *